United States Patent

Tani et al.

Patent Number: 5,952,416
Date of Patent: Sep. 14, 1999

[54] THERMOSETTING RESIN COMPOSITION FOR SLIDING MEMBERS

[75] Inventors: Kiyozumi Tani, Tokushima; Akira Matsubara, Kumagaya, both of Japan

[73] Assignee: Otsuka Kagaku Kabushiki Kaisha, Osaka, Japan

[21] Appl. No.: 08/696,927

[22] PCT Filed: Dec. 4, 1995

[86] PCT No.: PCT/JP95/02486

§ 371 Date: Aug. 16, 1996

§ 102(e) Date: Aug. 16, 1996

[87] PCT Pub. No.: WO96/18687

PCT Pub. Date: Jun. 20, 1996

[30] Foreign Application Priority Data

Dec. 16, 1994 [JP] Japan ..................................... 313583

[51] Int. Cl.$^6$ ................................ C08J 5/10; C08K 3/10; C08L 31/06

[52] U.S. Cl. ........................ 524/413; 452/448; 452/405; 452/445; 452/451; 430/425; 430/423; 430/449; 430/502

[58] Field of Search ..................... 523/513, 521, 523/527; 524/404, 405, 423, 430, 442, 444, 445, 448, 452, 450, 449, 492, 494, 495, 413, 502, 451, 425

[56] References Cited

U.S. PATENT DOCUMENTS 4,303,762  12/1981  Nakayama et al. ................. 525/299

FOREIGN PATENT DOCUMENTS

| 51-81852 | 7/1976 | Japan . |
|---|---|---|
| 51-111284 | 10/1976 | Japan . |
| 58-76413 | 5/1978 | Japan . |
| 56-74147 | 6/1982 | Japan . |
| 58-63752 | 4/1983 | Japan . |
| 59-176313 | 10/1984 | Japan . |
| 62-43454 | 2/1987 | Japan . |

Primary Examiner—James J. Seidleck
Assistant Examiner—U. K. Rajguru
Attorney, Agent, or Firm—Knobbe, Martens, Olson & Bear, LLP

[57] ABSTRACT

An object of the present invention is to provide a thermosetting resin composition which can impart high slidability and great abrasion resistance while maintaining the excellent properties of thermosetting resins such as outstanding heat resistance, high-precision moldability, long-term durability, great mechanical strength, etc. The thermosetting resin composition for a sliding member according to the present invention comprises 100 parts by weight of a thermosetting resin, 50 to 600 parts by weight of an inorganic filler and 2 to 20 parts by weight of polyolefin powder having a particle size of up to 200 μm, the inorganic filler containing potassium titanate fibers in an amount of 2 to 35 parts by weight per 100 parts by weight of the thermosetting resin.

8 Claims, 1 Drawing Sheet

THERMOSETTING RESIN COMPOSITION FOR SLIDING MEMBERS

TECHNICAL FIELD OF THE INVENTION

The present invention relates to a thermosetting resin composition for a sliding member.

BACKGROUND ART

In recent years, plastics materials as a substitute for metal materials have been actively researched and developed. These materials require various properties depending on their applications. For example, in the case of molded components having a sliding portion such as magnet switches, switch parts or the like among the components of electrical machinery and apparatus, importance is attached to the abrasion resistance and sliding characteristics of the molded components.

On the other hand, moldings of glass fiber reinforced unsaturated polyester resin produced by integrally molding and curing an unsaturated polyester resin, i.e. a typical thermosetting resin, and glass fibers are excellent in impact resistance, tensile strength, bending strength, etc. but have a drawback of poor slidability. Of thermosetting resins, resins such as melamine resins have high surface hardness and great abrasion resistance. However, once a single layer of hard surface has worn off, these resins become unsatisfactory in abrasion resistance like unsaturated polyester resins. Further, said resins are insufficient in lubricity.

The addition of a specific resin has been known as means for improving the abrasion resistance and slidability of thermosetting resins. For example, there have been proposed the addition of polytetrafluoroethylene resin (Teflon) powder (Japanese Unexamined Patent Publication Sho 51-81,852), and the addition of polyethylene (Japanese Unexamined Patent Publications Sho 51-89,546, Sho 51-111,284, Sho 56-74,147 and Sho 58-63,752) and so on.

The addition of asbestos, potassium titanate, wollastonite or the like has been proposed to incorporate fine reinforced fibers as part of a filler. The addition of potassium titanate fibers is known to effectively improve the sliding characteristics and the abrasion resistance (Japanese Unexamined Patent Publications Sho 58-76,413, Sho 59-176,313 and Sho 62-43,454, etc.).

However, these conventional methods failed to give resin compositions which are satisfactory in the excellent sliding characteristics and great abrasion resistance as required when the resin is used as the material for a sliding member.

DISCLOSURE OF THE INVENTION

An object of the present invention is to provide a thermosetting resin composition which can impart high slidability and great abrasion resistance while maintaining the excellent properties of thermosetting resins such as outstanding heat resistance, high-precision moldability, long-term durability, great mechanical strength, etc.

The inventors of the present invention conducted extensive research to achieve the above-mentioned object and found that a resin composition with the undermentioned specific formulation has the desired properties. The present invention has been completed based on this novel finding.

According to the present invention, there is provided a thermosetting resin composition for a sliding member, the composition comprising 100 parts by weight of a thermosetting resin, 50 to 600 parts by weight of an inorganic filler and 2 to 20 parts by weight of polyolefin powder having a particle size of up to 200 $\mu$m, the inorganic filler containing potassium titanate fibers in an amount of 2 to 35 parts by weight per 100 parts by weight of the thermosetting resin.

According to the present invention, there is also provided a thermosetting resin composition which can improve the sliding characteristics and abrasion resistance while maintaining the outstanding properties of thermosetting resins such as excellent heat resistance, high-precision moldability, long-term durability, great mechanical strength, etc.

Examples of thermosetting resins which can be used in the invention include a wide variety of conventional thermosetting resins such as unsaturated polyester resins, vinyl ester resins, phenolic resins, epoxy resins, melamine resins, diallyl phthalate resins, etc.

Useful unsaturated polyester resins are not specifically limited and include a wide range of polycondensation products of polyhydric alcohol with unsaturated polybasic acid and saturated polybasic acid, the products being usually used as a molding material. Polyhydric alcohols which can be used herein are, for example, ethylene glycol, propylene glycol, butanediol, diethylene glycol, dipropylene glycol, triethylene glycol, pentanediol, hexanediol, neopentanediol, hydrogenated bisphenol A, bisphenol A, glycerin, etc. Examples of unsaturated polybasic acids useful in the invention are maleic anhydride, fumaric acid, citraconic acid, itaconic acid, etc. Examples of useful saturated polybasic acids are phthalic anhydride, isophthalic acid, terephthalic acid, het acid (chlorendic acid), succinic acid, adipic acid, sebasic acid, tetrachlorophthalic anhydride, tetrabromophthalic anhydride, endomethylenetetrahydrophthalic anhydride, etc.

To heat-cure the unsaturated polyester resin, a crosslinking agent, and when required, a curing agent, a mold release agent, a thickener and the like may be incorporated into said resin. Crosslinking agents to be used include a wide variety of conventional agents which have a polymerizable double bond and which can be copolymerized with the unsaturated polyester resin. Examples of useful crosslinking agents are styrene, diallyl phthalate, methyl methacrylate, divinylbenzene, acrylamide, vinyltoluene, monochlorostyrene, acrylonitrile, triallyl isocyanurate and like vinyl monomers, diallyl phthalate prepolymers, etc. The amount of the crosslinking agent to be used is usually 25 to 70 parts by weight, preferably 35 to 65 parts by weight, per 100 parts by weight of the total amount of the unsaturated polyester resin and the crosslinking agent. Peroxides are usually used as the curing agent and include, for example, t-butyl peroxyoctoate, benzoyl peroxide, 1,1-di-t-butyl peroxy-3,3,5-trimethylcyclohexane, t-butyl peroxyisopropyl carbonate, t-butyl peroxybenzoate, dicumyl peroxide, di-t-butyl peroxide, lauroyl peroxide, di-t-butyl peroxyisophthalate, 2,5-dimethylhexane, 2,5-dihydroperoxide, cumene hydroperoxide, methyl ethyl ketone peroxide, etc. Examples of the mold release agent which can be used are stearic acid, oleic acid, zinc stearate, calcium stearate, aluminum stearate, magnesium stearate, stearic acid amide, oleic acid amide, carnauba wax, silicone oil, synthetic wax, etc. Examples of the thickener which can be used are magnesium oxide, magnesium hydroxide, calcium hydroxide, calcium oxide, and like metal compounds and isocyanate compounds, etc.

A vinyl ester resin can be used in the same manner as the unsaturated polyester resin. The vinyl ester resin can be used as admixed with the unsaturated polyester resin to partially replace the resin.

The phenolic resin to be used may be either a novolak-type phenolic resin or a resol-type phenolic resin. When a novolak-type phenolic resin is used, a curing agent is usually incorporated into the resin. While curing agents which can be used include various conventional ones, preferred curing agents are hexamethylenetetramine and like amine curing agents. Such curing agent is used in a proportion of 2 to 50 parts by weight per 100 parts by weight of the phenolic resin.

When an epoxy resin is used as the thermosetting resin, a curing agent is usually incorporated. The curing agent to be used can be selected from a wide range of conventional curing agents such as primary or secondary amine, acid anhydrides, phenolic resins, etc. These curing agents can be used either alone or in mixture. The curing agent can be used usually in a proportion of 2 to 200 parts by weight per 100 parts by weight of the epoxy resin. When a phenolic resin is used as the curing agent, the resulting composition is excellent in heat resistance and water resistance, and is hence preferred. When an acid anhydride is used as the curing agent, tertiary amine or imidazole or the like is added as a curing promoter in a proportion of usually 0.1 to 30 parts by weight per 100 parts by weight of the epoxy resin.

Useful melamine resins include addition condensation products of melamine with formaldehyde, ethers prepared by etherification of such product with a lower alcohol, etc.

A diallyl phthalate resin can be prepared from an allyl phthalate produced by the esterification of allyl alcohol with phthalic anhydride or from an allyl phthalate prepolymer produced by the polymerization of the allyl phthalate, using an organic peroxide as a curing catalyst.

When required, the foregoing phenolic resin, epoxy resin, melamine resin or diallyl phthalate resin, as is the case with unsaturated polyester resins, may also contain a curing agent, mold release agent, thickener, etc. although exclusive of some resins.

Of the above various thermosetting resins, unsaturated polyester resin, vinyl ester resin and mixtures thereof are especially suitable for use.

Inorganic fillers to be used in the invention include a wide variety of known fillers, e.g. fibers such as glass fibers, asbestos, wollastonite, xonotlite, aluminum borate fibers, magnesium borate fibers and potassium titanate fibers, and powder materials such as clay, talc, aluminum hydroxide, calcium carbonate, barium sulfate, mica and silicic anhydride. These inorganic fillers can be used either alone or in mixture. In particular, it is essential in the invention to use potassium titanate fibers as the inorganic filler.

Potassium titanate fibers to be used in the invention are not specifically limited and include, for example, potassium tetratitanate fibers, potassium hexatitanate fibers, potassium octatitanate fibers, etc. These potassium titanate fibers may be electrically conductive fibers which have been made electrically conductive by coating the surface of fibers with a metal, metallic oxide, carbon or the like or by calcining the fibers in a reducing atmosphere. Preferred potassium titanate fibers are those having a shape with an average fiber diameter of 0.1 to 1 $\mu$m, an average fiber length of 7 to 30 $\mu$m, and an aspect ratio of 7 to 300 from the standpoint of the slidability and increased strength. Commercially available potassium titanate fibers having such shape include "TISMO D" (trademark, product of Otsuka Kagaku Kabushiki Kaisha, potassium octatitanate whiskers with an average fiber diameter of 0.2 to 0.5 $\mu$m, an average fiber length of 10 to 20 $\mu$m, and an aspect ratio of 20 to 100), "TISMO N" (trademark, product of Otsuka Kagaku Kabushiki Kaisha, potassium hexatitanate whiskers with an average fiber diameter of 0.2 to 0.5 $\mu$m, an average fiber length of 10 to 20 $\mu$m, and an aspect ratio of 20 to 100), "TOFICA" (trademark, product of Nippon Whisker Kabushiki Kaisha, an average fiber diameter of 0.3 to 1 $\mu$m, and an average fiber length of 10 to 20 $\mu$m), etc. All of them can be suitably used in the present invention.

The amount of the inorganic filler to be used is 50 to 600 parts by weight per 100 parts by weight of the thermosetting resin. The 100 parts by weight of the thermosetting resin include the components required for curing, such as a crosslinking agent and a curing agent, in addition to the above-mentioned various resins. For example, when an unsaturated polyester resin or vinyl ester resin is used as the thermosetting resin, the inorganic filler is used in an amount of 50 to 600 parts by weight per 100 parts by weight of the total amount of the unsaturated polyester resin or vinyl ester resin and the crosslinking agent. When a phenolic resin, epoxy resin or melamine resin is used as the thermosetting resin, the inorganic filler is used in an amount of 50 to 600 parts by weight per 100 parts by weight of the total amount of the phenolic resin, epoxy resin or melamine resin and the crosslinking agent. When an allyl phthalate resin is used as the thermosetting resin, the inorganic filler is used in an amount of 50 to 600 parts by weight per 100 parts by weight of the allyl phthalate resin.

More than 600 parts by weight of the inorganic filler used renders the resulting composition unsatisfactory in polymer processability due to the increase of viscosity, whereas less than 50 parts by weight used gives a molded product which is insufficient in rigidity and strength.

It is essential in the invention to use potassium titanate as the inorganic filler. The potassium titanate is used in such an amount that the inorganic filler contains 2 to 35 parts by weight, preferably 4 to 25 parts by weight, of potassium titanate. A potassium titanate content of less than 2 parts by weight reduces the improvements of abrasion resistance and mechanical properties, whereas a content of more than 35 parts by weight impairs the workability of the compound and is therefore uneconomical. Hence the content outside said range is undesirable.

The polyolefin powder to be used in the invention has essentially a maximum particle size of up to 200 $\mu$m, preferably an average particle size of up to 80 $\mu$m, more preferably an average particle size of up to 70 $\mu$m, most preferably an average particle size of up to 50 $\mu$m. If the polyolefin powder having a particle size exceeding 200 $\mu$m is present in the resin composition, the obtained molded product would be likely to be uneven in the surface, and hence its presence is undesirable.

The polyolefin powder which can be used in the invention is various and includes conventional ones. For example, polyethylene powder is preferred as the polyolefin powder. Stated more specifically, the polyethylene powder which can be used in the invention is a polymer prepared by the polymerization of predominantly an ethylene monomer. Specific examples of such polyethylene powder are a high-density polyethylene prepared by the polymerization of ethylene according to a low pressure method (under conditions of 100 atm. at room temperature), a medium-density polyethylene prepared by the polymerization of ethylene according to a medium pressure method (under conditions of 30–100 atm.), and a low-density polyethylene prepared by the polymerization of ethylene according to a high pressure method (100 atm. or higher). It is also possible to use an ultrahigh-density polyethylene prepared by the polymerization of ethylene under special conditions. Further usable is an ethylene-propylene copolymer prepared using propylene as admixed with ethylene to partly replace the latter. In a cooling medium such as liquid nitrogen, these polymers are pulverized and classified for size selection before use.

The polyolefin powder has a molecular weight of preferably 30,000 to 2,000,000, more preferably 200,000 to 300,000. To achieve remarkable improvements in slidability, the polyolefin powder having a molecular weight of 50,000 to 1,000,000 is the most favorable.

The amount of the polyolefin powder to be used is 2 to 20 parts by weight per 100 parts by weight of the thermosetting resin. The amount of less than 2 parts by weight of polyolefin powder used fails to provide a molded product with a sufficient abrasion resistance, whereas the amount thereof exceeding 20 parts by weight would tend to adversely affect the mechanical properties and the heat resistance. Thus, the amount outside said range is improper. It is desirable in the invention to use polyolefin powder in an amount of 3 to 15 parts by weight per 100 parts by weight of the thermosetting resin. The 100 parts by weight of the thermosetting resin includes the components required for curing, such as a crosslinking agent and a curing agent as well as the above-mentioned various resins as is the case with the inorganic filler. For example, when an unsaturated polyester resin or vinyl ester resin is used as the thermosetting resin, the polyolefin powder is used in an amount of 50 to 600 parts by weight per 100 parts by weight of the total amount of the unsaturated polyester resin or vinyl ester resin and the crosslinking agent. When a phenolic resin, epoxy resin or melamine resin is used as the thermosetting resin, the polyolefin powder is used in an amount of 50 to 600 parts by weight per 100 parts by weight of the total amount of the phenolic resin, epoxy resin or melamine resin and the crosslinking agent. When an allyl phthalate resin is used as the thermosetting resin, the polyolefin powder is used in an amount of 50 to 600 parts by weight per 100 parts by weight of the allyl phthalate resin.

In the present invention, it is essential to use both potassium titanate fibers and polyolefin powder. The single use of either of them can not fully produce the effects as contemplated in the invention. Epoch-making remarkable slidability is imparted due to the surprising synergistic effect produced by the addition of both potassium titanate fibers and polyolefin powder. This matter is clear from Examples and Comparative Examples to be described later.

It is preferable to incorporate a low shrinking agent into the resin composition of the invention. Examples of the low shrinking agent are various and include a wide range of conventional agents. Examples are polystyrene, polymethyl methacrylate, methyl methacrylate copolymer, polyvinyl acetate, vinyl acetate copolymer, saturated polyester, vinyl chloride, polycaprolactone, cellulose acetate butyrate, modified polyurethane, styrene-butadiene elastomer, etc. These low shrinking agents can be used either alone or in mixture. If a low shrinking agent is used, a low shrinkage or non-shrinkage composition would be produced, and the composition would be superior in abrasion resistance and slidability and would be very suitable for use in molding an article, especially a gear.

According to the invention, organic fillers such as wood powder, pulps, mold release agents, pigments, flame retardants, etc. can be optionally used in addition to the above components.

In the preparation of the thermosetting resin composition of the invention, pre-mixing is conducted using a ribbon blender, kneader, Henschel mixer or the like, and then the pre-mixture is kneaded using a roll kneader, twin-screw kneader, co-kneader or the like. In the present invention, the kneaded mixture is made into granules or other form as by pulverization or extrusion, whereby a molding composition is produced.

The molding composition thus obtained can be molded by compression molding, injection molding or other desired methods. The mold temperature during molding is suitably selected according to the kind of thermosetting resin or the addition of other components. For example, the mold temperature is 150 to 180° C. in the case of epoxy resin, 140 to 190° C. in the case of phenolic (novolak) resin, and 120 to 180° C. in the case of unsaturated polyester resin and vinyl ester resin.

The resin composition of the invention prepared by the above-mentioned process is markedly superior in abrasion resistance to conventional resin compositions, and is comparable in other properties with them. It is noteworthy that the resin composition of the invention enables the use of glass fibers. The glass fibers tend to significantly degrade the abrasion resistance of the resin composition and has been heretofore used only in a limited amount for applications which require abrasion resistance. However, even when glass fibers are incorporated into the resin composition of the present invention, the composition can exhibit high abrasion resistance. The resin composition prepared according to the present invention is outstanding in mechanical strength and abrasion resistance and is widely usable for industrial applications.

The resin composition of the invention can be applied for a wide range of applications as a molding material and is very useful in the production of members which require abrasion resistance such as magnet switches, switches, cams and other power-transmitting materials. The invention provides useful materials long awaited in the field in which mechanical strength as well as abrasion resistance is required as in magnet switches.

BEST MODE FOR CARRYING OUT THE INVENTION

Figure 1:
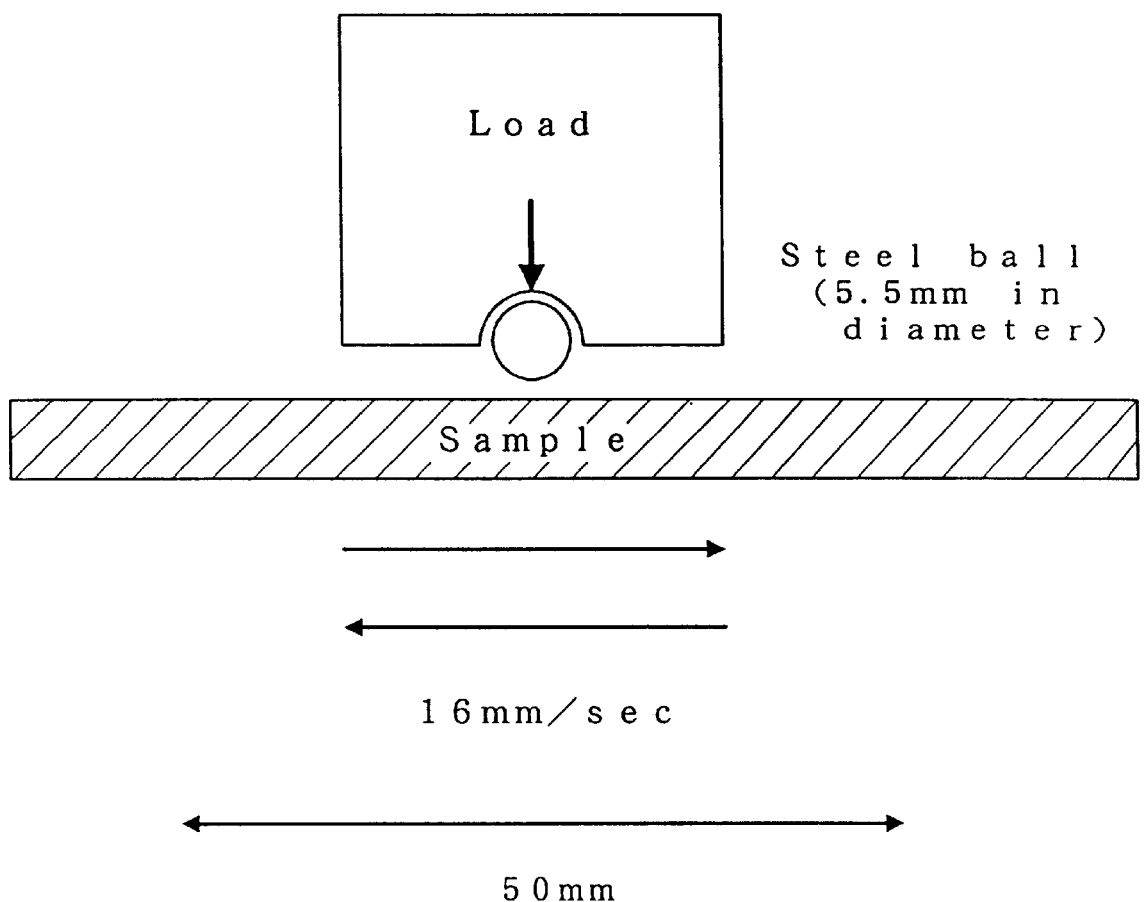
FIG. 1 is a sketch for clarification of a method of testing moldings for abrasion resistance.

Given below are Examples and Comparative Examples for clarifying the invention in more detail. Examples 1 to 4 and Comparative Examples 1 to 3

The starting materials used in the proportions shown below in Table 1 were kneaded using a twin-arm kneader, giving an isophthalic acid-type unsaturated polyester resin composition. The composition was compressed under a load of 200 kg/cm$^2$ at 150° C. for 4 minutes to produce a molded product. The isophthalic acid-type unsaturated polyester resin, glass fibers and high-density polyethylene as shown in Table 1 are those described below in detail. The counterparts shown in Tables 2 to 7 are the same as used herein. Isophthalic acid-type unsaturated polyester resin Propylene glycol (100 moles) and isophthalic acid (20 moles) were charged into a reactor equipped with a stirrer, reflux condenser, nitrogen gas inlet tube and thermometer. The mixture was heated to 210° C. and subjected to esterification reaction for 9 hours. The reaction mixture was cooled to 170° C. at an acid value of up to 10. After fumaric acid (80 moles) was added, the mixture was subjected to esterification reaction at 170 to 180° C. for 4 hours and further at 220° C. for 3 hours. The reaction was completed at an acid value of up to 20, and the reaction mixture was cooled. Then, hydroquinone was added in an amount of 0.015 part by weight based on the total amount of the components already charged, and a styrene monomer was added in an amount of 35 parts by weight based on the total amount of the components already charged, giving an isophthalic acid-type unsaturated polyester resin.

wherein $\mu_k$ is a coefficient of dynamic friction (–), F is a frictional force (kgf/cm$^2$), R is a distance (cm) between a friction detector and a sample, W is a load for compression (kgf/cm$^2$), and r is an average radius (cm) of the sample. The surface roughness was measured with a surface roughness configuration-measuring device (trademark "SURFCOM 300B", product of Tokyo Seimitsu Kabushiki Kaisha). The results are shown also in Table 1.

TABLE 1

|  | Example |  |  |  | Comp. Example |  |  |
|---|---|---|---|---|---|---|---|
|  | 1 | 2 | 3 | 4 | 1 | 2 | 3 |
| Isophthalic acid type unsaturated polyester resin | 100 | 100 | 100 | 100 | 100 | 100 | 100 |
| Styrene monomer | 20 | 20 | 20 | 20 | 20 | 20 | 20 |
| Calcium carbonate | 150 | 150 | 150 | 150 | 150 | 150 | 150 |
| t-Butyl peroxybenzoate | 4 | 4 | 4 | 4 | 4 | 4 | 4 |
| Zinc stearate | 10 | 10 | 10 | 10 | 10 | 10 | 10 |
| Glass fibers | 70 | 70 | 70 | 70 | 70 | 70 | 70 |
| TISMO D | 5 | 10 | 20 | 10 | 0 | 10 | 0 |
| High-density polyethylene | 5 | 10 | 10 | 20 | 0 | 0 | 10 |
| Coefficient of friction (–) | 0.35 | 0.28 | 0.23 | 0.25 | 0.50 | 0.30 | 0.35 |
| Abrasion amount (mg) | 0.4 | 0.28 | 0.12 | 0.2 | 2.1 | 1.6 | 1.8 |
| Surface roughness before test (R max) μm | 2 | 2 | 2 | 2 | 2 | 2 | 2 |
| Depth of wear on molding by steel ball (μm) | 10 | 7 | 3 | 5 | 51 | 41 | 48 |

Glass fibers: average fiber diameter 13 μm and average fiber length 6 mm

High-Density Polyethylene

A high-molecular-weight polyethylene powder having an average molecular weight of 200,000 to 300,000 was pulverized using a spiral mill to an average particle size of 70 μm.

The molded products obtained above were tested for abrasion resistance by the following method. The molded product was reciprocatingly slided over a distance of 1 km using a steel ball of 5.5 mm in diameter under a load of 200 g at a linear speed of 16 mm/s as shown in FIG. 1. The volume reduced by the abrasion (abrasion amount) was calculated by a difference in the weight as determined before and after reciprocating sliding motion, and the depth of wear produced on the molded product by the steel ball was measured. A coefficient of friction was calculated by the following equation:

$$\mu_k = \frac{FR}{Wr}$$

Table 1 shows the following. When potassium titanate fibers or high-density polyethylene was used alone, only a slight effect was produced. On the other hand, when both of them were used in combination, a remarkable effect was achieved.

EXAMPLES 5 TO 7 AND COMPARATIVE EXAMPLES 4 TO 6

The starting materials indicated below in Table 2 in the amounts shown therein were heated and kneaded, giving a molding composition. The molding composition was compressed at 160° C. under a load of 200 kg/cm$^2$ for 4 minutes, producing a molded product.

The properties of the molded product thus obtained were evaluated by the same methods as in Example 1. The results are shown also in Table 2.

TABLE 2

|  | Example |  |  | Comp. Example |  |  |
|---|---|---|---|---|---|---|
|  | 5 | 6 | 7 | 4 | 5 | 6 |
| Epoxy resin | 65 | 65 | 65 | 65 | 65 | 65 |
| Phenolic resin (novolak) | 35 | 35 | 35 | 35 | 35 | 35 |
| Aluminum oxide | 200 | 200 | 200 | 200 | 200 | 200 |
| Zinc sterate | 10 | 10 | 10 | 10 | 10 | 10 |
| TISMO D | 5 | 10 | 20 | 0 | 10 | 0 |
| High-density polyethylene | 5 | 10 | 20 | 0 | 0 | 10 |
| Coefficient of friction (–) | 0.38 | 0.30 | 0.22 | 0.46 | 0.28 | 0.30 |
| Abrasion amount (mg) | 0.32 | 0.24 | 0.12 | 1.5 | 1.2 | 1.32 |
| Surface roughness before test (R max) μm | 2 | 2 | 2 | 2 | 2 | 2 |
| Depth of wear on molding by steel ball (μm) | 8 | 6 | 3 | 38 | 30 | 33 |

EXAMPLES 8 TO 10 AND COMPARATIVE EXAMPLES 7 TO 9

The starting materials indicated below in Table 3 in the amounts shown therein were heated and kneaded, giving a molding composition. The molding composition was compressed at 160° C. under a load of 200 kg/cm$^2$ for 4 minutes, producing a molded product.

The properties of the molded product thus obtained were evaluated by the same methods as in Example 1. The results are shown also in Table 3.

TABLE 3

|  | Example | | | Comp. Example | | |
| --- | --- | --- | --- | --- | --- | --- |
|  | 8 | 9 | 10 | 7 | 8 | 9 |
| Phenolic resin (novolak) | 100 | 100 | 100 | 100 | 100 | 100 |
| Hexamethylenetetramine | 13 | 13 | 13 | 13 | 13 | 13 |
| Wood powder | 100 | 100 | 100 | 100 | 100 | 100 |
| Calcium carbonate | 50 | 50 | 50 | 50 | 50 | 50 |
| Magnesium oxide | 5 | 5 | 5 | 5 | 5 | 5 |
| Stearic acid | 5 | 5 | 5 | 5 | 5 | 5 |
| TISMO D | 5 | 10 | 20 | 0 | 10 | 0 |
| High-density polyethylene | 5 | 10 | 20 | 0 | 0 | 10 |
| Coefficient of friction (−) | 0.40 | 0.28 | 0.24 | 0.45 | 0.30 | 0.32 |
| Abrasion amount (mg) | 0.6 | 0.4 | 0.2 | 2.6 | 2.0 | 2.2 |
| Surface roughness before test (R max) μm | 2 | 2 | 2 | 2 | 2 | 2 |
| Depth of wear on molding by steel ball (μm) | 15 | 10 | 5 | 65 | 50 | 52 |

EXAMPLES 11 TO 14 AND COMPARATIVE EXAMPLES 10 TO 12

The starting materials indicated below in Table 4 in the amounts shown therein were heated and kneaded, giving a molding composition. The molding composition was compressed at 150° C. under a load of 200 kg/cm² for 4 minutes, producing a molded product.

The properties of the molded product thus obtained were evaluated by the same methods as in Example 1. The abrasion resistance was determined by the same method as in Example 1 with the exception of placing a load of 1,000 g on the steel ball. The results are shown also in Table 4.

TABLE 4

|  | Example | | | | Comp. Example | | |
| --- | --- | --- | --- | --- | --- | --- | --- |
|  | 11 | 12 | 13 | 14 | 10 | 11 | 12 |
| Isophthalic acid type unsaturated polyester resin | 100 | 100 | 100 | 100 | 100 | 100 | 100 |
| Styrene monomer | 20 | 20 | 20 | 20 | 20 | 20 | 20 |
| Calcium carbonate | 150 | 150 | 150 | 150 | 150 | 150 | 150 |
| t-Butyl peroxybenzoate | 4 | 4 | 4 | 4 | 4 | 4 | 4 |
| Zinc stearate | 10 | 10 | 10 | 10 | 10 | 10 | 10 |
| Glass fibers | 70 | 70 | 70 | 70 | 70 | 70 | 70 |
| TISMO D | 5 | 10 | 20 | 10 | 0 | 10 | 0 |
| High-density polyethylene | 5 | 10 | 10 | 20 | 0 | 0 | 10 |
| Coefficient of friction (−) | 0.7 | 0.45 | 0.4 | 0.42 | 1.0 | 0.8 | 0.85 |
| Abrasion amount (mg) | 2.1 | 1.28 | 0.6 | 0.92 | 7.2 | 6.0 | 6.8 |
| Surface roughness before test (R max) μm | 2 | 2 | 2 | 2 | 2 | 2 | 2 |
| Depth of wear on molding by steel ball (μm) | 54 | 30 | 15 | 24 | 180 | 156 | 175 |

EXAMPLES 15 TO 17 AND COMPARATIVE EXAMPLES 13 TO 15

The starting materials indicated below in Table 5 in the amounts shown therein were heated and kneaded, giving a molding composition. The molding composition was compressed at 160° C. under a load of 200 kg/cm² for 4 minutes, producing a molded product.

The properties of the molded product thus obtained were evaluated by the same methods as in Example 11. The results are shown also in Table 5.

TABLE 5

|  | Example | | | Comp. Example | | |
| --- | --- | --- | --- | --- | --- | --- |
|  | 15 | 16 | 17 | 13 | 14 | 15 |
| Epoxy resin | 65 | 65 | 65 | 65 | 65 | 65 |
| Phenolic resin (novolak) | 35 | 35 | 35 | 35 | 35 | 35 |
| Aluminum oxide | 200 | 200 | 200 | 200 | 200 | 200 |
| Zinc sterate | 10 | 10 | 10 | 10 | 10 | 10 |
| TISMO D | 5 | 10 | 20 | 0 | 10 | 0 |
| High-density polyethylene | 5 | 10 | 20 | 0 | 0 | 10 |
| Coefficient of friction (−) | 0.75 | 0.48 | 0.38 | 0.82 | 0.50 | 0.42 |

TABLE 5-continued

|  | Example | | | Comp. Example | | |
| --- | --- | --- | --- | --- | --- | --- |
|  | 15 | 16 | 17 | 13 | 14 | 15 |
| Abrasion amount (mg) | 1.8 | 1.2 | 0.6 | 6.0 | 5.4 | 5.8 |
| Surface roughness before test (R max) μm | 2 | 2 | 2 | 2 | 2 | 2 |
| Depth of wear on molding by steel ball (μm) | 45 | 30 | 15 | 150 | 135 | 141 |

EXAMPLES 18 TO 20 AND COMPARATIVE EXAMPLES 16 TO 18

The starting materials indicated below in Table 6 in the amounts shown therein were heated and kneaded, giving a molding composition. The molding composition was compressed at 160° C. under a load of 200 kg/cm² for 4 minutes, producing a molded product.

The properties of the molded product thus obtained were evaluated by the same methods as in Example 11. The results are shown also in Table 6.

TABLE 6

|  | Example | | | Comp. Example | | |
| --- | --- | --- | --- | --- | --- | --- |
|  | 18 | 19 | 20 | 16 | 17 | 18 |
| Phenolic resin (novolak) | 100 | 100 | 100 | 100 | 100 | 100 |
| Hexamethylenetetramine | 13 | 13 | 13 | 13 | 13 | 13 |
| Wood powder | 100 | 100 | 100 | 100 | 100 | 100 |
| Calcium carbonate | 50 | 50 | 50 | 50 | 50 | 50 |
| Magnesium oxide | 5 | 5 | 5 | 5 | 5 | 5 |
| Stearic acid | 5 | 5 | 5 | 5 | 5 | 5 |
| TISMO D | 5 | 10 | 20 | 0 | 10 | 0 |
| High-density polyethylene | 5 | 10 | 20 | 0 | 0 | 10 |
| Coefficient of friction (−) | 0.92 | 0.49 | 0.35 | 1.0 | 0.7 | 0.8 |
| Abrasion amount (mg) | 2.4 | 1.2 | 0.6 | 6.0 | 5.4 | 5.8 |
| Surface roughness before test (R max) μm | 2 | 2 | 2 | 2 | 2 | 2 |
| Depth of wear on molding by steel ball (μm) | 60 | 32 | 15 | 155 | 130 | 135 |

EXAMPLE 21 AND COMPARATIVE EXAMPLES 19 AND 20

The starting materials indicated below in Table 7 in the amounts shown therein were heated and kneaded, giving a molding composition. The molding composition was compressed at 160° C. under a load of 200 kg/cm² for 4 minutes, producing a molded product.

The properties of the molded product thus obtained were evaluated by the same methods as in Example 2. The results are shown also in Table 7.

TABLE 7

|  |  | Example | | |
| --- | --- | --- | --- | --- |
|  |  | 21 | 22 | 23 |
| Isophthalic acid-type unsaturated polyester resin |  | 100 | 100 | 100 |
| Styrene monomer |  | 20 | 20 | 20 |
| Calcium carbonate |  | 150 | 150 | 150 |
| t-Butyl peroxybenzoate |  | 4 | 4 | 4 |
| Zinc stearate |  | 10 | 10 | 10 |
| Glass fibers |  | 70 | 70 | 70 |
| TISMO D |  | 10 | 10 | 10 |
| Powdery polyethylene | Molecular weight 250,000 | 10 | — | — |
|  | Molecular weight 10,000 | — | 10 | — |
|  | Molecular weight 2,500,000 | — | — | 10 |
| Coefficient of friction (−) |  | 0.28 | 0.30 | 0.30 |
| Abrasion amount (mg) |  | 0.28 | 1.2 | 1.0 |

TABLE 7-continued

|  | Example | | |
| --- | --- | --- | --- |
|  | 21 | 22 | 23 |
| Surface roughness before test (R Max) μm | 2 | 2 | 2 |
| Depth of wear on molded product by steel ball (μm) | 7 | 30 | 25 |

What is claimed is:

1. A thermosetting resin composition for a sliding member, the composition comprising 100 parts by weight of a thermosetting resin, 50 to 600 parts by weight of an inorganic filler and 2 to 20 parts by weight of polyolefin powder having a particle size of up to 200 μm, the inorganic filler containing potassium titanate fibers in an amount of 2 to 35 parts by weight per 100 parts by weight of the thermosetting resin, the remaining inorganic filler being selected from the group consisting of asbestos, wollastonete, xonotlite, aluminum borate fibers, magnesium borate fibers, clay, talc, aluminum hydroxide, barium sulfate, mica, silicic anhydride, aluminum oxide, and magnesium oxide.

2. A thermosetting resin composition according to claim 1, wherein the polyolefin powder is polyethylene powder.

3. A thermosetting resin composition according to claim 2, wherein the polyethylene powder is at least one member selected from the group consisting of high-density polyethylenes, medium-density polyethylenes, low-density polyethylenes, ultrahigh-density polyethylenes and ethylene-propylene copolymers.

4. A thermosetting resin composition according to claim 1, wherein the polyolefin powder has a molecular weight of 30,000 to 2,000,000.

5. A thermosetting resin composition according to claim 1, wherein the polyolefin powder has a molecular weight of 200,000 to 300,000.

6. A thermosetting resin composition according to claim 1, wherein the thermosetting resin is at least one member selected from the group consisting of unsaturated polyester resins and vinyl ester resins.

7. A thermosetting resin composition according to claim 1 which contains a low shrinking agent.

8. A thermosetting resin composition according to claim 7, wherein the low shrinking agent is at least one member selected from the group consisting of polystyrene, polymethyl methacrylate, methyl methacrylate copolymer, polyvinyl acetate, vinyl acetate copolymer, saturated polyester, vinyl chloride, polycaprolactone, cellulose acetate butyrate, modified polyurethane, and styrene-butadiene elastomer.

\* \* \* \* \*